Sept. 25, 1962 J. L. McCORD 3,055,676
DEVICE FOR LUBRICATING AND PREVENTING VIBRATION
AND LOST MOTION IN THE LOWER BALL JOINT
SUSPENSION OF AN AUTOMOBILE
Filed July 29, 1960
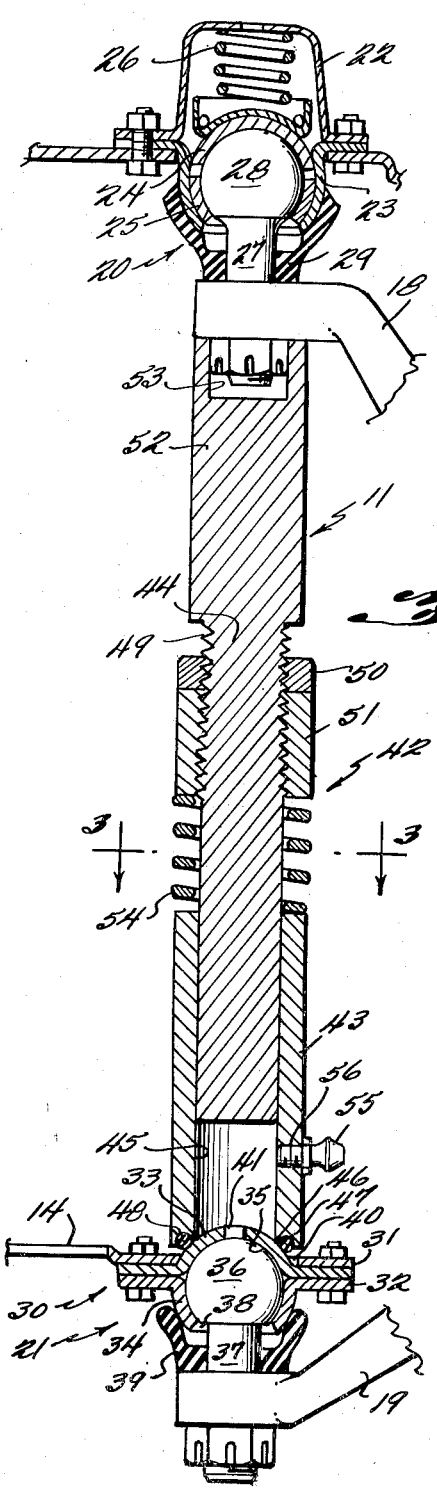
INVENTOR
JESSE L. McCORD
BY
Adams & Bush
ATTORNEY

United States Patent Office 3,055,676
Patented Sept. 25, 1962

3,055,676
DEVICE FOR LUBRICATING AND PREVENTING VIBRATION AND LOST MOTION IN THE LOWER BALL JOINT SUSPENSION OF AN AUTOMOBILE
Jesse L. McCord, P.O. Box 646, Covington, Ga.
Filed July 29, 1960, Ser. No. 46,225
3 Claims. (Cl. 280—96.2)

This invention relates to independent wheel suspension for motor vehicles of the type in which the weight load of the vehicle is transmitted to the front wheel through a spring suspended lower control arm having its outer free end pivotally connected by a ball type swivel joint to an arm member carried by the spindle of the adjacent wheel, and has more particular reference to a device for lubricating and preventing vibration and lost motion in the lower ball type swivel joint which carries the weight of the vehicle.

In front wheel suspension of the type to which this invention relates, upper and lower control arms pivoted on the vehicle have their outer ends pivotally connected by ball type swivel joints to upper and lower arm members carried by the spindle of the adjacent wheel. The lower control arm is spring suspended and transmits the weight load of the vehicle to the adjacent front wheel and thus tends to press the elements of the ball joint together, resulting in wear on the parts, causing vibration and lost motion, which eventually results in shimmy when driving over rough roads.

One object of the present invention is to provide a novel and improved apparatus for lubricating and reducing vibration and lost motion in the lower ball swivel joint.

Another object of the present invention is to provide apparatus for lubricating and reducing vibration and lost motion in the lower ball swivel joint, as characterized above, including resilient means for exerting a constant downward pressure on the socket in which the ball head of the ball swivel joint is mounted.

Another object of the present invention is to provide apparatus, as characterized above, wherein means are provided for adjusting the downward pressure applied to the socket in which the ball head of the swivel joint is mounted.

A further object of the present invention is to provide a device, as characterized above, which is simple and economical in construction, readily applied to existing wheel suspension devices, and is efficient in operation.

Other objects and advantages of the invention will appear in the following specification when considered with the accompanying drawings, wherein:

FIG. 1 is a fragmentary side elevational view of a front suspension having a device for lubricating and reducing vibration and lost motion constructed in accordance with the present invention mounted thereon;

FIG. 2 is an enlarged vertical sectional view of the device shown in FIG. 1;

FIG. 3 is a horizontal sectional view taken on the line 3—3 of FIG. 2; and

FIG. 4 is a bottom end view of the device shown in FIG. 2.

The present invention is an improvement over the invention disclosed and claimed in my co-pending application, Ser. No. 691,746, filed October 22, 1957, for Device for Preventing Vibration and Lost Motion in the Lower Ball Joint of an Independent Wheel Suspension for Motor Vehicles.

Referring now to the drawings, there is illustrated in FIG. 1, a right front wheel suspension arrangement, indicated generally at 10, as viewed from the rear of the vehicle, having a device, indicated generally at 11, for lubricating and reducing vibration and lost motion in the lower ball swivel joint and constructed in accordance with the present invention, mounted thereon.

The front wheel suspension arrangement may be of any usual type in which the weight load of the vehicle is transmitted to the front wheel through a control arm pivoted on the vehicle and connected at its outer end by a ball type swivel joint to an arm carried by the spindle of the adjacent wheel.

As shown, the suspension arrangement comprises the front cross member 12 having an upper control arm 13 and a lower control arm 14 pivotally mounted thereon and a front suspension spring 15 and shock absorber 16 connecting the lower control arm 14 to the cross member 12.

The wheel 17 is mounted on a spindle carried by a steering knuckle having upper and lower arms 18 and 19, respectively, with the upper knuckle arm 18 connected to the free end of the upper control arm 13 by means of an upper swivel ball joint, indicated generally at 20, for swinging steering movement, and the lower knuckle arm 19 connected to the free end of the weight supporting lower control arm 14 by means of a lower swivel ball joint, indicated generally at 21.

The upper swivel ball joint 20 may be of any usual construction. As shown, it comprises an assembly including a housing made up of an upper part 22 and a lower part 23, suitably secured together and to the outer end of the upper control arm 13, as by riveting or bolting; a bearing ring or socket made in two parts, an upper part 24 and a lower part 25 mounted within the housing; a coil compression spring 26 mounted within the housing and pressing downward on the upper part of the bearing ring; a ball stud 27 having its ball head 28 journaled in the socket and having its tapered shank seated in a tapered opening formed in the upper knuckle arm 18 and secured therein by a nut threaded on its lower protruding end; and a resilient sealing member 29 mounted on the shank of the ball stud.

The upper swivel ball joint 20 is arranged to permit swinging of the knuckle arm 18 and, at the same time, is adapted to accommodate pivoting in a substantially vertical plane of the upper control arm 13.

The lower swivel ball joint 21 may be of any suitable usual construction. As shown, it comprises a socket 30 formed by a pair of generally rectangular plate members 31 and 32 suitably secured together, as by riveting or bolting. The plates 31 and 32 have opposed outwardly bulged central portions 33 and 34, respectively, forming a substantially spherical recess 35 in which is received the ball head 36 of a ball stud 37 having a tapered shank extending downwardly through an elongated opening 38 formed in the bottom of the outwardly bulged portion 34 of the lower plate 32 and through a tapered hole formed in the bottom knuckle arm 19 and secured therein by a suitable nut threaded on its bottom end portion; and a resilient sealing member 39 mounted on the shank of the ball stud between the knuckle arm 19 and the lower socket member 32. The socket 30 is suitably secured to the outer end of the lower control arm 14, as by bolting or riveting, with the outwardly bulged portion 33 in the upper plate 31 of the socket protruding through an opening 40 formed in the control arm 14 to provide access to a lubricating opening 41 formed in the outwardly bulged portion 33.

The lower swivel ball joint 21 is arranged to accommodate the swinging steering movement of the knuckle arm 19 and supports the weight load of the vehicle.

The device 11 for lubricating the lower ball joint and eliminating vibration and taking up lost motion between the socket 30 and the ball head 36 by holding the socket 30 tightly pressed against the ball head 36, is shown as comprising a link 42 mounted between the upper and lower knuckle arms 18 and 19, respectively, with its upper end engaging the under side of the upper knuckle arm 18 and its lower end positioned to exert downward pressure on the socket 30 of the lower swivel ball joint 21. The link 42 is provided with means for adjusting its length so as to compensate for lost motion in the swivel joint caused by wear on the socket 30 and ball head 36 and for providing lubrication for the ball joint. This adjusting and lubricating means consists of a hollow tube 43 on the lower end of the link and an elongated tubular member 44 at the upper end which is slidably and rotatably fitted in the open upper end of the hollow tube 43 for telescopic adjustment relative to the latter.

The open bottom end portion of the hollow tube 43 forms a socket 45 with the end walls surrounding the socket cut away to form a concave curved surface, as indicated at 46, conforming to the curvature of the outer surface of the outward bulged central portion 33 of the upper part 31 of the socket 30 carried by the lower control arm 14. The curved surface 46 is provided with a circular groove 47 in which is embedded an O-ring seal 48, preferably made of "neoprene." The seal 48 engages the outer surface of the outwardly bulged portion 33, thereby insuring positive lubrication and keeping the grease channelled downwardly and foreign matter out, and bases the device more firmly on the lower ball joint assembly.

The tubular member 44, preferably and as shown, is a solid member and has its intermediate portion externally threaded, as at 49, to provide for axial movement thereon of a pair of lock nuts 50, 51. The upper end portion of the tubular member 44 has an enlarged head 52 formed thereon provided with a cylindrical recess forming a socket 53.

A coil compression spring 54 is mounted on the tubular member 44 between the upper end of the hollow tube 43 and the lower lock nut 51.

A lubricating nipple 55 is mounted in an opening 56 formed in the side wall of the hollow tube 43 below the bottom end of the tubular member 44 to permit the interior of the tube 43 to be filled with grease; thus, the hollow tube 43 acts as a grease reservoir for the lower ball joint assembly. The solid unthreaded lower portion of the tubular member 44 is slidably and rotatably received in the upper portion of the hollow tube 43. This portion of the tubular member is machined with just sufficient clearance from the inner perimeter of the hollow tube to provide for a film of grease from the reservoir to maintain the slidability of the tubular member relative to the tube and seals the tube from upward leakage. The constant up and down movement of the tubular member within the hollow tube provides a continuous downward forcing of the grease from the reservoir into the lower ball joint assembly.

The link 42 is mounted between the upper knuckle arm 18 and the lower knuckle arm 19 with the upper end of the tubular member 44 engaging the under surface of the upper knuckle arm 18 and with the protruding shank of the upper ball stud 27 and the nut thereon received in the socket 53 to prevent any lateral movement of the link 42 relative to the upper knuckle arm, and with the bottom end of the hollow tube 43 engaging the outer surface of the outwardly bulged central portion 33 of the upper part 31 of the socket carried by the lower control arm 14. The lock nuts 50 and 51 are adjusted to compress the spring 54 to provide the pressure on the socket 30 required to take up the lost motion between the socket 30 and the ball head 36 mounted thereon.

From the foregoing description the operation of the device is believed obvious. When the link 42 has been mounted on a front wheel suspension as above described and the pressure of the compression spring 54 properly adjusted, the spring will cause a continuous predetermined resilient pressure to be exerted downwardly on the socket 30 of the lower swivel ball joint, in a direction in alignment with the longitudinal axis of the ball stud 37, taking up any lost motion between the socket and the ball head 36 mounted therein caused by wear, and thereby preventing vibration in the lower swivel ball joint. At the same time, the constant pressure and up and down vibration of the tubular member within the hollow tube provides a continuous forced lubrication of the lower ball joint assembly.

Obviously, the invention is not restricted to the particular embodiment thereof herein shown and described.

What is claimed is:

1. In an independent wheel suspension for a dirigible front wheel of a motor vehicle of the class wherein upper and lower knuckle arms on the front wheel knuckle carry fixed ball studs having their ball heads journaled in socket members fixed respectively on the free ends of upper and lower control arms pivoted on a cross frame on the vehicle, with the lower control arm transmitting the weight load of the vehicle to the wheel, adjustable resilient means for continuously forcibly lubricating and taking up lost motion between the lower socket member and the ball head journaled therein including a link having its upper end engaging the upper knuckle arm and its lower end positioned to exert a downward pressure on the lower socket member to reduce wear on and vibration between said lower socket member and the ball joint journaled therein, said link comprising a hollow grease reservoir tube at its lower end, an elongated solid cylindrical member having an external threaded portion intermediate its ends and with its lower end portion slidably mounted in the open upper end of said grease reservoir tube for slidable up and down movement therein, a lock nut mounted on the threaded portion of said elongated solid cylindrical member, and a compression spring mounted on said solid cylindrical member between said lock nut and the upper end of said hollow grease reservoir tube, the construction and arrangement being such that the constant up and down movement of said solid cylindrical member in said grease reservoir tube as the motor vehicle is operated will continuously force the grease downwardly therein and adjust the effective overall length of the link.

2. Apparatus as set forth in claim 1, wherein said hollow grease reservoir tube has a lateral opening therein to permit its hollow interior to be filled with a lubricant and wherein said socket carried by said lower control arm is provided with a lubricating opening communicating with the interior of said hollow grease reservoir tube.

3. Apparatus as set forth in claim 1, wherein the lower end wall of said hollow grease tube is cut away to form a curved surface conforming to the socket carried by said lower control arm and carries a circular resilient sealing member engaging said socket.

References Cited in the file of this patent

UNITED STATES PATENTS

| 343,769 | Levi | June 15, 1886 |
| 1,970,859 | Lenze | Aug. 21, 1934 |
| 2,304,291 | Wahlberg | Dec. 8, 1942 |
| 2,822,185 | Mineck | Feb. 4, 1958 |